UNITED STATES PATENT OFFICE.

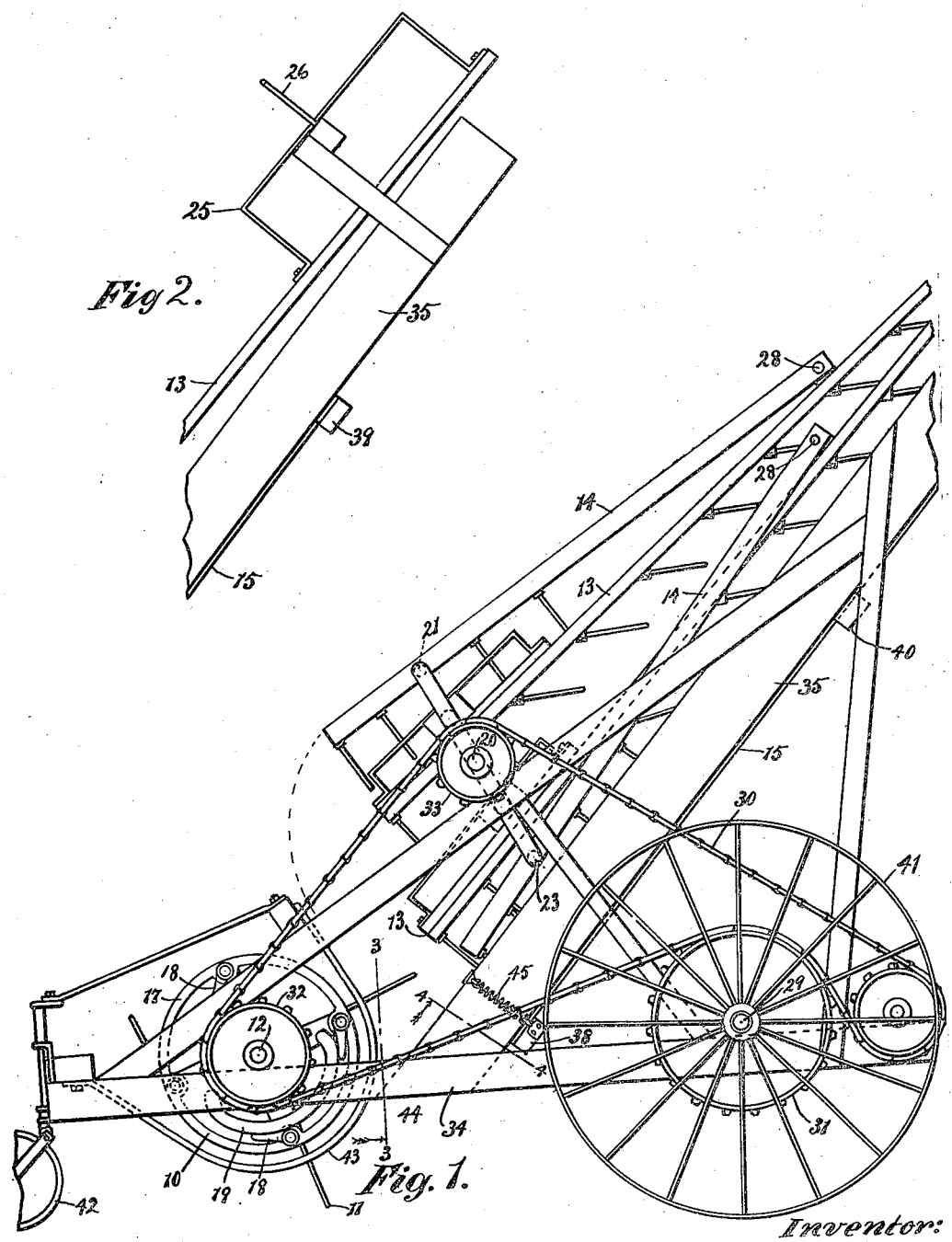

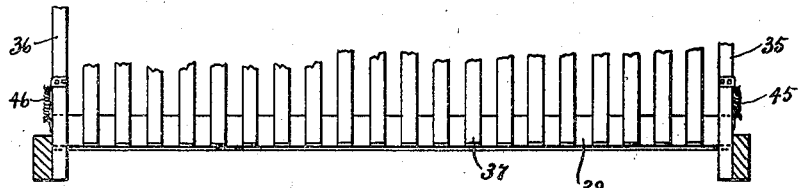
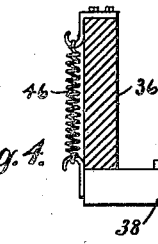
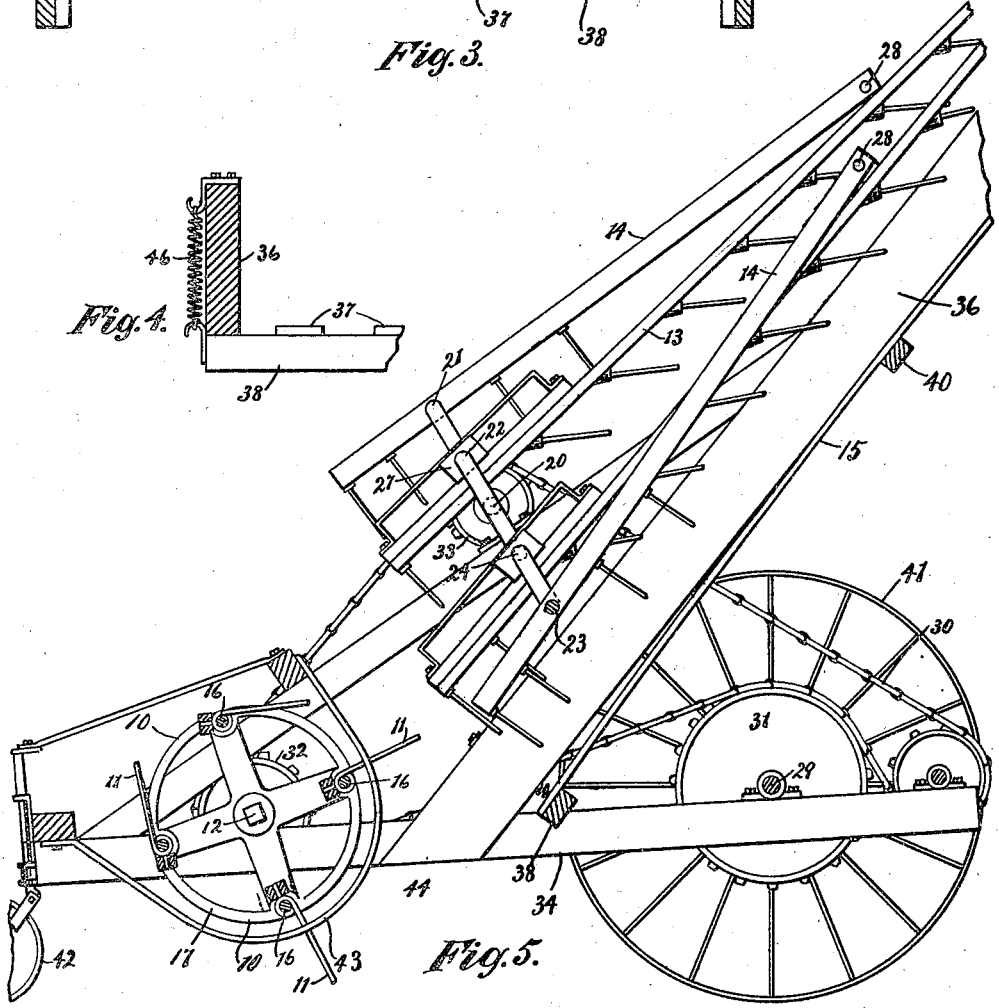

CHARLES HARTMAN, OF SANDWICH, ILLINOIS, ASSIGNOR TO SANDWICH MANUFACTURING COMPANY, A CORPORATION OF ILLINOIS.

HAY-LOADER.

1,353,586. Specification of Letters Patent. Patented Sept. 21, 1920.

Application filed October 3, 1919. Serial No. 328,240.

*To all whom it may concern:*

Be it known that I, CHARLES HARTMAN, a citizen of the United States, and resident of Sandwich, county of Dekalb, and State of Illinois, have invented certain new and useful Improvements in Hay-Loaders, of which the following is a specification and which are illustrated in the accompanying drawings, forming a part thereof.

The invention relates to hay loaders, and more especially to those which comprise a raking reel or cylinder as the gathering means combined with the reciprocating bar type of elevating means.

The object of the invention is the provision of a machine of the type indicated which will operate effectively in both light and heavy accumulations of hay, and which is, therefore, equally applicable for use in loading from the swath or windrow.

In the accompanying drawings:

Figure 1 is a detail side elevation of a hay loader embodying the improvement provided by the present invention, some parts being broken away to facilitate illustration of the novel feature, and a deflected position of the lower end portion of the deck being indicated by dotted lines;

Fig. 2 is similar to Fig. 1, but shows the upper end portion of the machine;

Figs. 3 and 4 are detail sectional views taken on the lines 3—3 and 4—4, respectively, of Fig. 1; and Fig. 5 is a central longitudinal sectional view of the machine showing the lower end portion of the deck in deflected position.

The invention is illustrated as applied to a machine having operating elements of the form shown in the patent to August Otto, Jr., No. 1,099,311, dated June 9, 1914, for hay loader. These elements comprise a gathering cylinder 10, which rotates in the direction for movement of its rake teeth 11, forwardly below and upwardly in front of the cylinder shaft 12, and in the present construction this shaft is so positioned with reference to the inclined deck 15 and reciprocating toothed elevator bars 13, 14, that the latter become engaged with the hay immediately in front of the cylinder for moving the same upwardly over the deck.

As shown, the rake teeth 11 of the gathering cylinder 10 are mounted in heads 16, which extend between and are journaled in the cylinder ends 17, and the rake teeth are held to a substantially radial position during their said forward and upward travel but are free to swing during the remainder of their movement. For this purpose a cam wiper 18 is carried by each of the rake heads 16, and these several cam wipers 18 are engaged with a stationary cam plate 19 during a part of each revolution of the cylinder. Likewise, in the particular form of construction selected for illustration, the reciprocating elevator bars 13, 14, are of different lengths and are actuated by a crank shaft 20, having opposed sets of cranks 21, 22, and 23, 24, the cranks 21 and 23 being longer than the cranks 22 and 24.

While the present invention is not concerned with this particular arrangement of long and short elevator bars 13, 14, and long and short cranks 21, 22, 23, 24, for actuating the same, it should be observed that the connection of all of the elevator bars with the several cranks of the crank shaft 20 is at the lower ends of the bars, while the longer bars 13 are equipped with bails 25 at their upper ends which slide in vertically extended loops 26 (Fig. 2). The longer elevator bars 13 are thus permitted to rise and fall at their upper ends to accommodate substantial variations in the quantity of hay being moved over the deck, while all of the said elevator bars have a fixed path of movement at their lower ends.

As shown, each of the longer elevator bars 13 has a sliding journal box 27 for receiving one of the shorter cranks 22 or 24 of the crank shaft 20, while the longer cranks 21 and 23 of the crank shaft 20 are each directly journaled in one of the shorter elevator bars 14. Furthermore, the upper end of each of the said shorter elevator bars 14 is pivotally attached to one of the longer elevator bars 13, as at 28 (Fig. 1). The longitudinal movement of all of the elevator bars is thus equal to the total throw of the longer cranks 22 and 24, while the motion of the longer elevator bars 13 toward and away from the deck 15 is only equal to the throw of the shorter cranks 21, 23.

The gathering cylinder 10 and the elevator bars 13, 14, are, as usual, both driven from the main axle 29, as by a sprocket chain 30, which is engaged with a sprocket wheel 31 on the axle and which turns about two other sprocket wheels 32 and 33, one on the cylinder shaft 12 and the other on the crank shaft 20.

The cam plate 19 may be mounted upon a horizontal sill 34 of the main frame, beyond the end of the gathering cylinder 10, and is preferably of such length that the rake teeth 11 of each set are released by the movement of the corresponding cam wiper 18 beyond the end of the said cam plate when the hay gathered thereby has been brought into the path of movement of the lower ends of the toothed elevator bars 13, 14. The elevator bars thus serve to strip the hay from the rake teeth of the gathering cylinder without any tendency of these two parts to move the hay in different directions at the same time.

The transfer of the hay from the gathering to the elevating means is thus accomplished without injury to the crop and without affording appreciable resistance to the operation of the machine, while none of the hay is carried over the top of the gathering cylinder to be deposited upon the field in rear of the machine.

While a fixed path of movement for the lower ends of the elevator bars, as 13, 14, is thus important in securing the desired coöperation of these parts with the gathering cylinder 10, it is found that yielding of the lower end portion of the deck 15 is also important to secure satisfactory operation of the machine when there is a wide variation in the bulk of hay engaged by the gathering cylinder, as in loading from the swath and from a windrow. That is to say, a position of the lower end portion of the deck 15 suitable for the passage of large accumulations of hay is likely to permit of smaller accumulations being rolled over and over and thus turned into a rope by a repeated engagement therewith of the lower end portions of the toothed elevator bars before the hay is carried up the deck, while a position of the lower end portion of the deck designed for satisfactory operation of the machine in light accumulations of hay may cause a complete choking and stalling of the machine when a heavy accumulation of hay is suddenly encountered.

Furthermore, adjustment of the position of the lower end portion of the deck 15 with respect to the paths of movement of the lower end portions of the toothed elevator bars 13, 14, should be automatic and in accordance with the quantity of hay delivered by the gathering cylinder 10, because of the wide variation in the stand of hay which frequently occurs upon different parts of the same field. On the other hand, adjustability in position of the upper end portion of the deck is not required, both because the hay is distributed over the deck during its upward travel and because the longer elevator bars 13 are free to move toward and away from the deck at their upper ends.

In carrying out the present invention the deck 15 is made elastically flexible but is rigidly held between the upwardly inclined frame members 35, 36, from about the midlength of the deck to the upper end of the same. As shown, the deck 15 is composed of a plurality of flexible strips or slats 37, each extending continuously from the top to the bottom of the deck, and all of the said strips or slats are secured to end and intermediate cross-bars 38, 39, 40, the upper and intermediate cross-bars 39 and 40 being each firmly secured to the upwardly inclined frame members 35 and 36, but the lower cross-bar 38 being free. As the slats 37 are normally straight, the deck 15 is normally flat throughout its length and parallel with the lower edges of the upwardly inclined frame members 35, 36, as shown by full lines in Fig. 1. Flexing of the slats 37, however, permits the deck to yield from the intermediate cross-bar 40 downwardly, the greatest yielding movement being at the extreme lower end of the deck.

If desired a pair of coil springs 45, 46, may be employed to supplement the normal tendency of the slats 37 to hold the deck flat. As shown, each of these springs reacts between one end of the bottom cross-bar 38 and the adjacent frame member 35, 36. When this construction is employed the lower end portion of the deck 15 may be described as floating, thereby automatically accommodating itself to variations in the amount of hay received from the gathering cylinder. Yielding of the lower end portion of the deck to the position indicated by full lines in Fig. 5, insures against choking and stalling when an unusually heavy accumulation of hay is encountered, while the immediate return of the lower end portion of the deck to its normal position when the pressure of hay against the same is relieved provides for a proper action of the elevator bars upon lighter accumulations of hay. Furthermore, as the deck is rigid in its upper portion the yielding of its lower end portion to receive a large accumulation of hay does not interfere with the proper operation of the upper end portions of the elevator bars upon a lighter accumulation which may have already been passed to the upper part of the deck.

The machine is illustrated as having a pair of main drive wheels 41, mounted upon the opposite ends of the axle 29, and a pair of caster wheels 42, located at the extreme rear end of the frame. Guard strips 43 are extended about the front and under side of the gathering cylinder 10. The guard strips 43 are of usual construction, but the location of the cylinder shaft 12 and crank shaft 20 with reference to the deck 15 is an important feature of the present construction. As shown, these parts are so positioned that a wide free open space 44 is provided between the guard strips 43 and the lower end of the deck 15, and the lower ends of the elevator bars 13 extend in their movement beyond the plane of the lower end of the deck. Ample room is thus provided for the passage of large accumulations of hay without interfering with the efficient operation of the machine in a light crop, because of the effective stripping of the hay from the rake bars of the cylinder by the rake teeth of the elevator bars.

I claim as my invention—

1. In a hay loader, in combination, a flexible inclined deck continuous from end to end rigidly held at its upper end, the lower end of the deck being free, gathering means delivering to the lower end of the deck, and elevating means operating over the deck.

2. In a hay loader, in combination, a flexible inclined deck continuous from end to end rigidly held throughout a substantial portion of its length adjacent its upper end, the lower end of the deck being free, gathering means delivering to the lower end of the deck, and elevating means operating over the deck.

3. In a hay loader, in combination, a flexible inclined deck continuous from end to end rigidly held at its upper end, the lower end of the deck being free, and a plurality of longitudinally reciprocable toothed elevator bars acting over the deck throughout its length, the said elevator bars being confined to a definite path of movement at their lower ends but being free to operate at different distances from the plane of the deck at their upper ends.

4. In a hay loader, in combination, a flexible inclined deck continuous from end to end rigidly held throughout a substantial portion of its length adjacent its upper end, the lower end of the deck being free, and a plurality of longitudinally reciprocable toothed elevator bars acting over the deck throughout its length, the said elevator bars being confined to a definite path of movement at their lower ends but being free to operate at different distances from the plane of the deck at their upper ends.

5. In a hay loader, in combination, a wheeled frame comprising a pair of forwardly and upwardly inclined parallel side bars and upper and intermediate cross-bars rigidly connecting the said side bars adjacent their upper ends and at the mid-height of the same, respectively, a deck comprising a plurality of flexible strips arranged parallel with the said side bars and each rigidly connected to the said upper and intermediate cross-bars and extending below the same to the level of the lower ends of the side bars but having no rigid connection with the frame at their lower ends, and elevating means operating over the said deck throughout its length.

6. In a hay loader, in combination, a wheeled frame comprising a pair of forwardly and upwardly inclined parallel side bars and upper and intermediate cross-bars rigidly connecting the said side bars adjacent their upper ends and at the mid-height of the same, respectively, a deck comprising a plurality of flexible strips arranged parallel with the said side bars and each rigidly connected to the said upper and intermediate cross-bars and extending below the same to the level of the lower ends of the side bars but having no rigid connection with the frame at their lower ends, and elevating means operating over the said deck throughout its length, the said elevating means acting in a definite path with respect to its nearest approach to the normal plane of the deck at its lower end but being free to operate at different distances from the plane of the deck at its upper end.

7. In a hay loader, in combination, a wheeled frame comprising a pair of forwardly and upwardly inclined parallel side bars and upper and intermediate cross-bars rigidly connecting the said side bars adjacent their upper ends and at the mid-height of the same, respectively, a deck comprising a plurality of flexible strips arranged parallel with the said side bars and each rigidly connected to the said upper and intermediate cross-bars and extending below the same to the level of the lower ends of the side bars but having no rigid connection with the frame at their lower ends, and a plurality of longitudinally reciprocable toothed elevator bars acting over the deck throughout its length.

8. In a hay loader, in combination, a wheeled frame comprising a pair of forwardy and upwardly inclined parallel side bars and upper and intermediate cross-bars rigidly connecting the said side bars adjacent their upper ends and at the mid-height of the same, respectively, a deck comprising a plurality of flexible strips arranged parallel with the said side bars and each rigidly connected to the said upper and intermediate cross-bars and extending below the same to the level of the lower ends of the side bars but having no rigid connection with the frame at their lower ends, and a plurality of longitudinally reciprocable toothed elevator bars acting over the deck throughout its length, the said elevator bars being confined to a definite path of movement at their lower ends but being free to operate at different distances from the plane of the deck at their upper ends.

9. In a hay loader, in combination, a wheeled frame comprising a pair of forwardly and upwardly inclined parallel side bars and upper and intermediate cross-bars rigidly connecting the said side bars adjacent their upper ends and at the mid-height of the same, respectively, a deck comprising a plurality of flexible strips arranged parallel with the said side bars and each rigidly connected to the said upper and intermediate cross-bars and extending below the same to the level of the lower ends of the side bars but having no rigid connection with the frame at their lower ends, a cross-piece uniting all of the deck strips at their lower ends, springs connecting the ends of the last-mentioned cross-piece with the frame, and elevating means operating over the said deck throughout its length.

10. In a hay loader, in combination, a wheeled frame, a flexible inclined deck continuous from end to end rigidly held in the said frame throughout a substantial portion of its length adjacent its upper end but having no rigid connection with the frame at its lower end, springs connecting the lower end of the deck with the frame, and elevating means operating over the deck throughout its length.

11. In a hay loader, in combination, a wheeled frame, an elastically flexible inclined deck rigidly held in the said frame throughout a substantial portion of its length adjacent its upper end but having no rigid connection with the frame at its lower end, and elevating means operating over the deck throughout its length.

12. In a hay loader, in combination, a wheeled frame, an elastically flexible inclined deck rigidly held in the said frame throughout a substantial portion of its length adjacent its upper end but having no rigid connection with the frame at its lower end, and elevating means operating over the deck throughout its length, the said elevating means acting in a definite path with respect to its nearest approach to the normal plane of the deck at its lower end but being free to operate at different distances from the plane of the deck at its upper end.

13. In a hay loader, in combination, a wheeled frame, an elastically flexible inclined deck rigidly held in the said frame throughout a substantial portion of its length adjacent its upper end but having no rigid connection with the frame at its lower end, and a plurality of longitudinally reciprocable toothed elevator bars acting over the deck throughout its length.

14. In a hay loader, in combination, a wheeled frame, an elastically flexible inclined deck rigidly held in the said frame throughout a substantial portion of its length adjacent its upper end but having no rigid connection with the frame at its lower end, and a plurality of longitudinally reciprocable toothed elevator bars acting over the deck throughout its length, the said elevator bars being confined to a definite path of movement at their lower ends but being free to operate at different distances from the plane of the deck at their upper ends.

15. In a hay loader, in combination, a traveling frame having a forwardly and upwardly inclined deck comprising a vertically swinging lower end portion, a transverse toothed gathering cylinder located in rear of the lower end of the deck and rotating forwardly at its under side upon an axis which is above the main plane of the deck, and a plurality of toothed elevator bars longitudinally reciprocable over the deck and oscillating in a plane which is perpendicular to the face of the deck, the said elevator bars extending in their movements immediately adjacent the front of the said gathering cylinder.

16. In a hay loader, in combination, a traveling frame having a forwardly and upwardly inclined deck comprising a vertically swinging lower end portion, a transverse gathering cylinder having movable rake teeth located in rear of the lower end of the deck and rotating forwardly at its under side upon an axis which is above the main plane of the deck, a plurality of longitudinally reciprocable toothed elevator bars extending over the deck from immediately in front of the gathering cylinder to the upper end of the deck, and means controlling the movement of the cylinder teeth operating to maintain the said teeth in position to advance the hay engaged therewith during the travel forwardly below and upwardly in front of the cylinder to, but not beyond, the zone of operation of the elevator bars.

17. In a hay loader, in combination, a traveling frame having a forwardly and upwardly inclined deck comprising a vertically swinging lower end portion, a transverse gathering cylinder having swinging rake teeth located in rear of the lower end of the deck and rotating forwardly at its under side upon an axis which is above the main plane of the deck, a plurality of longitudinally reciprocable toothed elevator bars extending over the deck from immediately in front of the gathering cylinder to the upper end of the deck, and means preventing the swinging of the cylinder teeth during their travel forwardly below and upwardly in front of the cylinder, the said teeth being free to swing during their travel rearwardly over the cylinder.

18. In a hay loader, in combination, a traveling frame having a forwardly and upwardly inclined deck which is vertically yielding at its lower end, a transverse toothed gathering cylinder located in rear of the lower end of the deck and rotating forwardly at its under side upon an axis which is above the normal plane of the deck, and a plurality of longitudinally reciprocable toothed elevator bars oscillating in vertical planes and extending over the deck from immediately in front of the said gathering cylinder to the upper end of the deck.

19. In a hay loader, the combination with an inclined deck continuous from end to end, of a toothed gathering cylinder turning forwardly at its under side located at a substantial distance in rear of the lower end of the deck and with its axis substantially on a level with the said lower end of the deck to provide a free open space immediately in front of the cylinder, and longitudinally reciprocating toothed elevator bars moving over the deck and beyond its lower end.

20. In a hay loader, the combination with a flexible inclined deck continuous from end to end rigidly held at its upper end but yielding downwardly and forwardly at its lower end to pressure of hay against the same, of a toothed gathering cylinder turning forwardly at its under side located at a substantial distance in rear of the lower end of the deck to provide a free open space immediately in front of the cylinder, and longitudinally reciprocating toothed elevator bars moving over the deck and beyond its lower end.

21. In a hay loader, the combination with an inclined deck normally flat from end to end, of a toothed gathering cylinder turning forwardly at its under side located at a substantial distance in rear of the lower end of the deck and with its axis substantially on a level with the said lower end of the deck to provide a free open space immediately in front of the cylinder, and longitudinally reciprocating toothed elevator bars moving over the deck.

22. In a hay loader, the combination with a flexible inclined deck normally flat from end to end rigidly held at its upper end but yielding downwardly and forwardly at its lower end to pressure of hay against the same, of a toothed gathering cylinder turning forwardly at its under side located at a substantial distance in rear of the lower end of the deck to provide a free open space immediately in front of the cylinder, and longitudinally reciprocating toothed elevator bars moving over the deck.

23. In a hay loader, the combination, with an inclined deck elastically yielding downwardly and forwardly at its lower end to pressure of hay against the same, of a toothed gathering cylinder turning forwardly at its under side located in rear of the deck and delivering to its lower end, and longitudinally reciprocating toothed elevator bars moving over the deck.

CHARLES HARTMAN.